Sept. 29, 1970 K. EDER 3,531,373
METHOD AND DEVICE FOR CONTROLLING THE INTAKE AND/OR DISCHARGE
DURING THE BIOLOGICAL OXIDATION OF ALCOHOL TO ACETIC ACID
Filed Dec. 7, 1967 2 Sheets-Sheet 1

Sept. 29, 1970 K. EDER 3,531,373
METHOD AND DEVICE FOR CONTROLLING THE INTAKE AND/OR DISCHARGE DURING THE BIOLOGICAL OXIDATION OF ALCOHOL TO ACETIC ACID
Filed Dec. 7, 1967 2 Sheets-Sheet 2
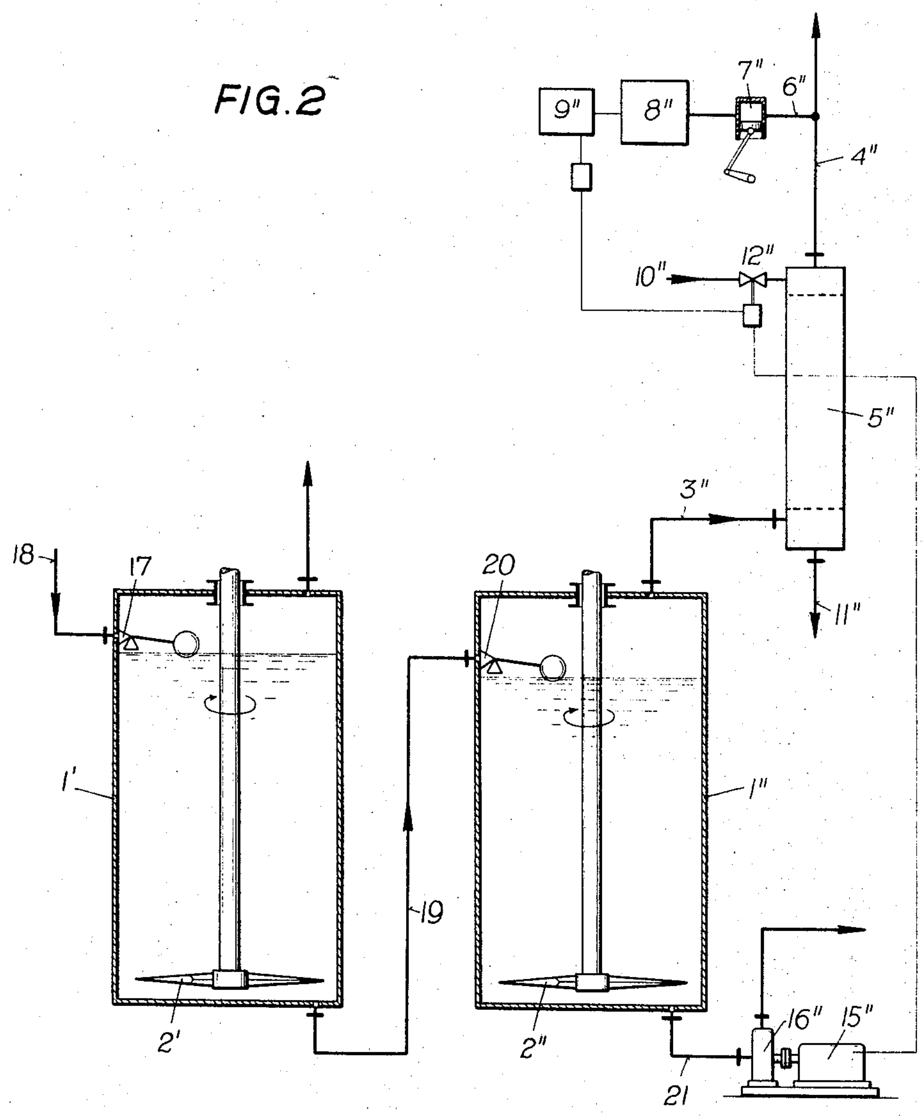

United States Patent Office 3,531,373

Patented Sept. 29, 1970

3,531,373

METHOD AND DEVICE FOR CONTROLLING THE INTAKE AND/OR DISCHARGE DURING THE BIOLOGICAL OXIDATION OF ALCOHOL TO ACETIC ACID

Karl Eder, Vienna, Austria, assignor to Vogelbusch Gesellschaft m.b.H., Vienna, Austria, a company of Austria Filed Dec. 7, 1967, Ser. No. 688,726
Int. Cl. C12j *1/04, 1/10*
U.S. Cl. 195—49 10 Claims

ABSTRACT OF THE DISCLOSURE

A method of controlling the intake and/or discharge of fermentation material in the biological oxidation of alcohol to acetic acid by fermentation with respect to the alcohol concentration of the waste gases leaving the fermentation in which the waste gases are washed with water so as to maintain a substantially constant concentration of alcohol in the washed waste gases and the rate of flow of wash water is used to control the intake and/or discharge of fermentation material from the fermentation; a process for the production of acetic acid, both batchwise and continuously, including the said control process and apparatus for carrying out the control process and the preparation of acetic acid using the control process.

Figure 1:
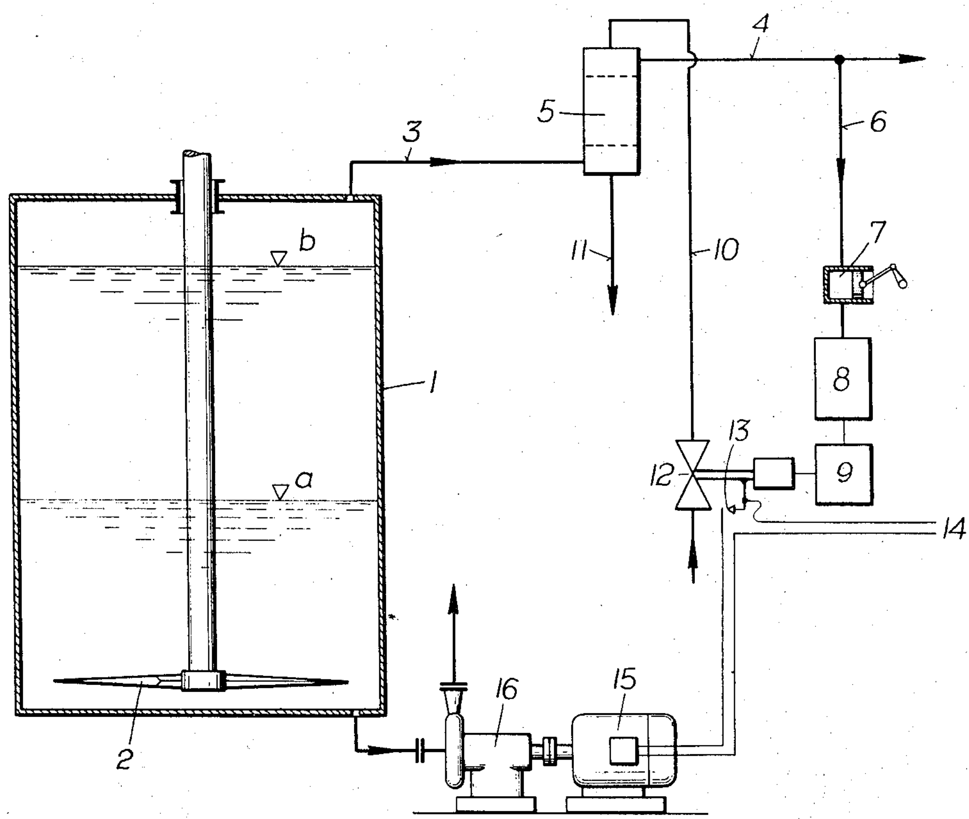

The invention relates to a process and apparatus for the control of the biological oxidation of alcohol to acetic acid by absorbent or submerged fermentation.

It is known that good fermentation conditions for the oxidation of alcohol to acetic acid can be achieved by controlling the intake and/or discharge of the fermentation precipitate and/or product with respect to the concentration of alcohol in the waste gases leaving the acetifier. The alcohol vapour contained in the stream saturated mixture of waste gases will always correspond to the alcohol concentration of the fermentation precipitate and/or product, this correspondence not being related to either the nature of the aeration system or the level of material in the acetifier but being solely a function of the fermentation temperature which is as a rule kept constant. Thus, when acetic acid is produced batchwise, the fermentation precipitate in the acetifier will, in many cases, have an alcohol concentration of 5% by volume immediately after the acetifier has been filled with fresh mash and this concentration will reduce during the course of the fermentation, to approximately 0.15% by volume. At the same time, the corresponding alcohol concentration of the waste fermentation gases leaving the acetifier will reduce at approximately the same rate, e.g. about 13.5 mg. of alcohol vapour per litre of waste gas will reduce to about 0.4 mg. of alcohol vapour per litre of waste gas.

In order to determine the alcohol concentration of the waste fermentation gases, it has been proposed to employ an analyser working on the principle of the catalytic oxidation of alcohol, i.e. exploiting the thermal effect caused by the oxidation of the alcohol. However, experiments in this respect have shown that the concentration of alcohol in the waste gases flowing into the analyser should only contain a maximum of 2 mg. of alcohol per litre of waste gas. Thus, if waste gases coming directly from the acetifier and containing about 13.5 mg. of alcohol per litre of waste gas, at the start of the fermentation process, are fed into such an analyser, the efficacy of the overloaded catalyser will be considerably reduced within a short period of time, thus preventing the analyser from registering the concentration of alcohol in the waste gases in a satisfactory manner.

It is an object of the present invention to provide a control process for the biological oxidation of alcohol to acetic acid of the type referred to above the accuracy of which process is independent of the alcohol concentration in the fermentation waste gases even when using an analyser based on the catalytic oxidation of alcohol. According to the invention, this is achieved by washing the fermentation waste gases or part of the waste gases with water so as to maintain a constant alcohol concentration in the waste gases leaving the washing step, the volume of wash water required to keep the concentration of alcohol in the waste gases constant being used to control the intake and/or discharge of the fermentation precipitate and/or product. Thus, whilst the concentration of alcohol in the waste gases directly from the acetifier constitutes the variable which determines the control of the process, it is an advantage of this invention that this variable is not directly measured by the analyser which serves only to enable this variable to determine the control of the process in another form, i.e. as the required volume of wash water. The higher the concentration of alcohol in the fermentation waste gases flowing from the acetifier, the more wash water will be required to maintain the constant alcohol concentration in the washed waste gases and vice versa. Thus, the volume of wash water required to maintain the alcohol concentration of the washed fermentation waste gases constant forms a variable which corresponds to the momentary concentration of alcohol in the unwashed waste gases. Thus, the process of the invention can be carried out using an analyser operating on the principle of the catalytic oxidation of alcohol as the life of the catalyst in the apparatus will be extended as the concentration of alcohol in the waste gases fed into it is reduced. Now, as the concentrations of alcohol concerned can be reduced, without difficulty, to a value which is considerably below the concentrations occuring after the acetifier has been filled, by means of the controlled washing of the waste gases, the catalyst will not be subjected to unduly high concentrations of alcohol and will thus have a long life.

Suitably, the constant alcohol concentration of washed waste gases is set at the required residual alcohol concentration of the fermentation precipitate. Any catalysts used need then only serve to oxidise low concentrations of alcohol, as only a relatively low residual alcohol concentration in the fermentation precipitate will be required to bring about the fermentation of a subsequent batch without delay. Further, any required residual alcohol concentration in the finished fermentation product to be discharged from the acetificator can also be obtained with absolute accuracy. The interruption of the wash water supply which takes place when the required residual alcohol concentration has been attained, can thus trigger the discharge of the fermentation precipitate and/or fermentation product.

The process of the invention can be used to control the continuous production of acetic acid, independent of whether such continuous production is carried out in a single-vat or multiple-vat system. In this case, control of the intake or discharge can also be controlled with respect to the residual alcohol content of the fermentation product being discharged. In the case of continuous acetic acid production, the discharge may be triggered off at the moment of the water supply being interrupted. At the same time, it will not be of any significance for the invention whether the control acts on the supply of fresh fermentation precipitate or on the discharge of the already fermented fermentation product. In the case of duplex- or multiple-vat systems it may be appropriate, under certain circumstances, to let the control act on that pump which conveys fermenting mash from one acetifier to the next.

An apparatus for carrying out the process of the invention will generally comprise, a fermentation tank with a waste gas washer interposed into the waste gas line, and instrument lines, which are preferably provided with a dosage pump, branching off the waste gas line leading from the waste gas washer, leading the waste gases to an analyser serving to register the alcohol concentration of the washed waste gases. This analyser is connected to a control device by means of which the momentarily required volume of washing water to keep the alcohol concentration of the washed waste gases constant, can be varied by means of a valve installed in the washing water supply connected to the control device. This valve may possess a control contact which moves according to the valve settings and which will only close the circuit to the electrical drive motor of the discharge pump of the fermentation tank if the valve is in its closed position.

In order that the invention may be well understood two embodiments thereof will now be described with reference to the accompanying drawings in which:

FIG. 1 is a schematic diagram of a plant for the batchwise production of acetic acid; and FIG. 2 is a schematic diagram of a plant for the continuous production of acetic acid.

Referring now to FIG. 1 of the drawings, a plant for the batchwise production of acetic acid comprises a closed acetifier 1 provided with a rotating air circulation system 2. From the top of acetifier 1 waste gas line 3 leads to the bottom of waste gas washer 5, which comprises a column filled with Raschig rings to achieve a good washing. From the upper end of waste gas washer 5, waste gas line 4 leads to the atmosphere and instrument waste gas line 6, in which dosage pump 7 is installed, branches off from lines 4 and leads to analyser 8 which measures the alcohol concentration of the washed waste gases. Analyser 8 works on the principle of the catalytic oxidation of alcohol and is connected to control device 9 which in turn controls motor valve 12 which controls the supply of wash water to waste gas washer 5. Wash water outlet 11 is provided at the bottom of waste gas washer 5. Motor valve 12 is provided with control contact 13 which moves in accordance with the valve settings and which only closes the circuit 14 to the electrical drive motor 15 of the discharge pump 16 of the acetifier when motor valve 12 is in the closed position, which will be the case when the alcohol concentration of the washed waste gases, equals the alcohol concentration of the unwashed waste gases which is co-ordinated with the required residual alcohol concentration of the fermentation precipitate.

The waste gases given off by the submerged fermentation process in acetifier 1 and which contain alcohol vapours, pass through waste gas line 3 into waste gas washer 5, flow upwardly through waste gas washer 5 and leave it through line 4. The wash water fed in through wash water supply line 10 flows through the waste gas washer 5 from top to bottom and is discharged through wash water discharge 11. As a result of this counter-current flow in waste gas washer 5 part of the alcohol vapours contained by the waste gases will be absorbed by the wash water. Thus, the waste gases leaving the waste gas washer 5 through waste gas line 4 will, in general, have a lower alcohol concentration than the waste gases flowing into waste gas washer 5. The concentration of alcohol in the waste gases in waste gas washer 5 will be reduced in inverse ratio to the volume of wash water supplied to the waste gas washer. Part of the washed waste gases are withdrawn from line 4 by means of dosage pump 7 and are passed to analyser 8. The latter measures the alcohol concentration of the washed waste gases and signals this, electrically to control device 9, which latter, by correspondingly activating the motor valve 12 which controls the supply of wash water to waste gas washer 5, maintains the alcohol concentration of the waste gases discharged from the waste gas washer at the value which corresponds to the required residual alcohol concentration of the fermentation precipitate. As soon as this residual alcohol concentration has been attained in the acetifier, there cannot be any further reduction of the alcohol concentration of the waste gases in the waste gas washer 5, as otherwise the above-mentioned control condition would not be complied with. The control device 9 thus closes motor valve 12 and this will cause the electrical drive motor 15 to be switched on via control contact 13. Consequently discharge pump 16 pumps away finished fermentation product from the acetifier 1 until it is only filled with residue as indicated at *a*. By means of a simple automatic device it is possible to switch the discharge pump off again after the required volume of finished fermentation product has drained away, fresh fermentation precipitate being subsequently supplied until the full level of acetifier 1 as indicated at *b* has been attained. Subsequently, the process as described will start afresh.

If desired a pneumatically or hydraulically controlled valve, also equipped with a corresponding control contact, can be used instead of motor valve 12, provided that a corresponding control device is also used.

Referring now to FIG. 2 of the drawing a system for the continuous production of acetic acid comprises a first closed acetifier 1' and a second closed acetifier 1'' provided with rotating air circulation systems 2' and 2'' respectively. The liquid level in acetifier 1' is maintained constant by a float valve 17, the shutoff mechanism of which is located in a line 18 through which the required volume of fresh fermentation precipitate is continuously fed to acetifier 1'. The fermenting mash then flows through line 19 into second acetifier 1'', in which a float valve 20 controls the volume of mash coming from acetifier 1'. The final fermentation product is discharged via line 21, a discharge pump 16'' and a line 22. The control systems 3'', 4'', 5'', 6'', 7'', 8'', 9'', 10'', 11'' and 12'' is similarly arranged to the control system 3, 4, 5, 6, 7, 8, 9, 10, 11 and 12 described with reference to FIG. 1 of the drawings.

Fermentation precipitate containing about 10% by volume of alcohol is fed into acetifier 1' through line 18, the corresponding air supply being provided through the air circulation system 2'. The alcohol concentration in the acetifier 1' is determined by the fermentation rate in the second acetifier 1''. Preferably the alcohol concentration in acetifier 1' is maintained at about 3% by volume, corresponding to an acid concentration of about 6–7%. Empirically, the highest fermentation rate will be obtained with this acid concentration whilst, at the same time, the volumes of the acetifiers can be reduced. In accordance with the volume discharged from acetifier 1'', the fermenting fermentation precipitate is fed into it via a line 19. In acetifier 1'' alcohol content is reduced to about 0.15% by volume. The air passing into the fermentation precipitate through the air circulation system 2'' of second acetifier supplies the oxygen which is required for the biological oxidation of the alcohol and is saturated with steam and alcohol vapour whilst passing through the fermentation precipitate layer. The waste fermentation gas thus produced passes into waste gas washer 5'' through waste gas line 3'', and is then discharged to the atmosphere via line 4''. By means of dosage pump 7'' and line 6'', part of the flow of the washed waste gases is fed to analyser 8'' which measures the alcohol concentration of the washed waste gases and which gives an electrical signal to control device 9'' as described in connection with FIG. 1. Control device 9'' activates motor valve 12'' so that sufficient wash water is fed through the motor valve 12'' to waste gas washer 5'' to produce the desired alcohol content in the waste gases flowing from the washer. In general, it is desirable that the concentration of alcohol in the waste gas discharged from the waste gas washer which will correspond to the alcohol concentration of the final fermentation product. In the present case, the final fermentation product is drawn off from acetifier 1'', i.e. the alcohol concentration of the fermentation precipitate in the acetifier 1'' amounts to about 0.15% by volume. Thus, when the concentration of alcohol in the waste gas from acetifier 1'' falls to an amount corresponding to this level the supply of wash water to waste gas washer 5'' will be stopped by valve 12'' which is so arranged as to start pump motor 15'' when in the closed position and consequently pump motors will be started and final fermentation product will be drawn off through pump 16''. The lowering of the level of liquid in acetifier 1'' will open the float valves 20 and 17 and fresh fermentation precipitate will thus be fed into the acetifier 1' and/or fermenting fermentation precipitate will be fed to the acetifier 1''.

The process for the control of intake and/or discharge in accordance with the invention can, of course, also be applied to the continuous single-vat system. In this case, the fresh fermentation precipitate is fed immediately into the acetifier 1'', the acetifier 1' being by-passed via line 19.

If desired control valve 12'' instead of controlling an electrical drive motor as described above may be connected to a corresponding control valve in the waste gas line 21. In the same manner, the pump 16'' with the drive motor 15'' may be arranged in line 19 which connects the acetifiers, the discharge from the acetifiers 1'' then taking place through a waste gas line designed as an overflow. The float valve 20 would then become superfluous.

I claim:

1. A method of controlling the intake and/or discharge of fermentation material in the biological oxidation of alcohol to acetic acid by fermentation with respect to the alcohol concentration in the waste gases leaving the fermentation in which said waste gases are washed with water so as to maintain a substantially constant concentration of alcohol in the washed waste gases and the rate of flow of wash water is used to control the intake and/or discharge of fermentation material from the fermentation.

2. A method according to claim 1 wherein the flow of wash water ceases when the alcohol concentration in the unwashed waste gases is equal to the constant concentration in the washed waste gases and the cease of flow of wash water causes fermentation material to be discharged from the fermentation.

3. A method according to claim 1 wherein the constant concentration of alcohol in the washed waste gases is maintained at a level corresponding to the desired residual alcohol content in the final fermentation product.

4. A method according to claim 3 wherein the constant concentration of alcohol in the washed waste gases is maintained at a level corresponding to a residual alcohol content in the final fermentation product of about 0.15% by volume.

5. A method according to claim 1 wherein the washed waste gases are fed to an analyser, the signal from which controls the flow of wash water.

6. A method according to claim 5 wherein said analyser employs the principle of the catalytic oxidation of alcohol to determine the alcohol content in the washed waste gases.

7. A method according to claim 5 wherein only a portion of the washed waste gases only is metered to the analyser.

8. A process for the production of acetic acid by the biological oxidation of alcohol by fermentation wherein the intake and/or discharge of fermentation material to the fermentation is controlled by a method according to claim 1.

9. A method according to claim 8 wherein said fermentation is carried out batchwise.

10. A method according to claim 8 wherein the fermentation is carried out on a continuous basis.

References Cited

UNITED STATES PATENTS

| | | | |
|---|---|---|---|
| 3,002,894 | 10/1961 | Rungaldier et al. | 195—117 |
| 3,010,881 | 11/1961 | Markhof | 195—117 |
| 3,252,870 | 5/1966 | Braun et al. | 195—49 |
| 3,445,245 | 5/1969 | Ebner | 99—147 |

LIONEL M. SHAPIRO, Primary Examiner

U.S. Cl. X.R.

23—230, 232; 195—49, 103.5